US006945438B1

(12) United States Patent
Shih et al.

(10) Patent No.: US 6,945,438 B1
(45) Date of Patent: Sep. 20, 2005

(54) PESTICIDE SPRAYING CART

(76) Inventors: Chun-Chia Shih, No. 176, Sec. 1, Guangming Rd., Puyan Village, Changhua County (TW); Jen Yen Yen, No. 22, Haojin Rd., Puyan Village, Changhua County (TW)

( * ) Notice: Subject to any disclaimer, the term of this patent is extended or adjusted under 35 U.S.C. 154(b) by 0 days.

(21) Appl. No.: 11/044,925

(22) Filed: Jan. 26, 2005

(51) Int. Cl.[7] .......................... B05B 11/02; B67D 5/06

(52) U.S. Cl. ..................... 222/608; 222/186; 222/631; 222/529; 222/537; 222/544; 239/147; 239/176; 239/722; 239/337; 239/526; 239/532

(58) Field of Search .......................... 111/118, 7.1–7.4, 111/127, 925; 239/146, 147, 176, 722, 302, 239/337, 525, 526, 532; 222/160, 608, 186, 222/630, 631, 529, 537, 544

(56) References Cited

U.S. PATENT DOCUMENTS 3,764,072 A * 10/1973 Morehouse et al. ........ 239/722

* cited by examiner

*Primary Examiner*—Christopher J. Novosad
(74) *Attorney, Agent, or Firm*—Pro-Techtor Int'l Services

(57) ABSTRACT

Provided is a pesticide spraying cart. In one embodiment, the comprises a pesticide tank, a retractable handle, two wheels, a recess provided between the wheels, a longitudinal hose compartment provided in a rear of the tank, a coil hose adapted to either extend out of the hose compartment by pulling or retract thereinto automatically after the force exerted on the coil hose has been released, a spray gun provided at an open end of the coil hose, a hook for holding the spray gun in an unused position, a pipe is extended from the coil hose into the tank, and a foot operated pump assembly provided in the recess. Repeatedly pressing a foot pedal to pressurize the tank, pulling the coil hose out of the hose compartment, and activating the spray gun will shoot out a uniform spray of liquid pesticide.

4 Claims, 4 Drawing Sheets

PESTICIDE SPRAYING CART

BACKGROUND OF THE INVENTION

1. Field of Invention

The present invention relates to gardening equipment and more particularly to a two-wheeled pesticide spraying cart with improved characteristics.

2. Related Art

There is a portable pesticide sprayer for gardening available. In operation, a user may repeatedly press a trigger to shoot out a spray of liquid pesticide via a hose onto, for example, flowers in a garden. However, the prior art suffered from several disadvantages. For example, its atomization is not uniform due to differences of force exerted on the trigger during the spraying. Also, tank of the sprayer is relatively small. This means that a number of times of pesticide fillings are required for completing the spraying, particularly in a large garden. This is very inconvenient.

There is another pesticide tank sprayer for gardening available. Its tank worn on the back of a person is larger than that of the above prior art. Thus, the number of times of pesticide fillings is reduced. However, a great burden is borne upon the back wearing the tank. This is also not desirable. Thus, the need for improvement still exists.

SUMMARY OF THE INVENTION

It is therefore an object of the present invention to provide a pesticide spraying cart comprising a pesticide tank including a top filling opening and a bottom outlet; a retractable handle longitudinally mounted in a rear of the tank; two wheels rotatably mounted at both rear bottom corners of the cart; a recess provided between the wheels in a lower rear portion of the cart; a longitudinal hose compartment provided in the rear of the tank, the hose compartment being open to a top of the cart and disposed above the recess; a coil hose adapted to either extend out of the hose compartment by pulling or retract thereinto automatically after the force exerted on the coil hose has been released; a spray gun provided at an open end of the coil hose; a hook provided on an outer surface of the tank for holding the spray gun in an unused position; a pipe is extended from the other end of the coil hose into a position proximate a bottom of the tank; and a pump assembly provided in the recess and including a foot pedal projected rearward beyond the recess, a coil pipe being in fluid communication with the tank, a transverse, inner first bar fixedly provided across the recess, a transverse, outer second bar fixedly provided across the recess and aligned with the wheels, two parallel air pumps fixedly coupled to the second bar at its one ends, two parallel arms interconnected the foot pedal and the first bar, a cross member formed across the arms and coupled to the other ends of the air pumps, a reservoir formed between outlets of the air pumps and the coil pipe and being in fluid communication therewith, and two resilient members mounted on both ends of the first bar, each resilient member having one end urged against a bottom of the recess and the other end urged against the cross member, whereby repeatedly pressing the foot pedal to pressurize pesticide contained in the tank, moving the cart to a predetermined location, pulling the coil hose out of the hose compartment, and activating the spray gun will shoot out a uniform spray of liquid pesticide.

It is another object of the present invention to provide a pesticide spraying cart comprising a pesticide tank including a top filling opening and a bottom outlet; a retractable handle longitudinally mounted in a rear of the tank; two wheels rotatably mounted at both rear bottom corners of the cart; a recess provided between the wheels in a lower rear portion of the cart; a longitudinal hose compartment provided in the rear of the tank, the hose compartment being open to a top of the cart and disposed above the recess; a coil hose adapted to either extend out of the hose compartment by pulling or retract thereinto automatically after the force exerted on the coil hose has been released; a spray gun provided at an open end of the coil hose; a longitudinal spray gun chamber provided beside the hose compartment for receiving the spray gun in an unused position; a pipe is extended from the other end of the coil hose into a position proximate a bottom of the tank; and a pump assembly provided in the recess and including a foot pedal projected rearward beyond the recess, a coil pipe being in fluid communication with the tank, a transverse, inner first bar fixedly provided across the recess, a transverse, outer second bar fixedly provided across the recess and aligned with the wheels, two parallel air pumps fixedly coupled to the second bar at its one ends, two parallel arms interconnected the foot pedal and the first bar, a cross member formed across the arms and coupled to the other ends of the air pumps, a reservoir formed between outlets of the air pumps and the coil pipe and being in fluid communication therewith, and two resilient members mounted on both ends of the first bar, each resilient member having one end urged against a bottom of the recess and the other end urged against the cross member, whereby repeatedly pressing the foot pedal to pressurize pesticide contained in the tank, moving the cart to a predetermined location, pulling the coil hose out of the hose compartment, and activating the spray gun will shoot out a uniform spray of liquid pesticide.

In one aspect of the present invention, the resilient members are torsion springs.

The above and other objects, features and advantages of the present invention will become apparent from the following detailed description taken with the accompanying drawings.

DETAILED DESCRIPTION OF THE INVENTION

Figure 1:
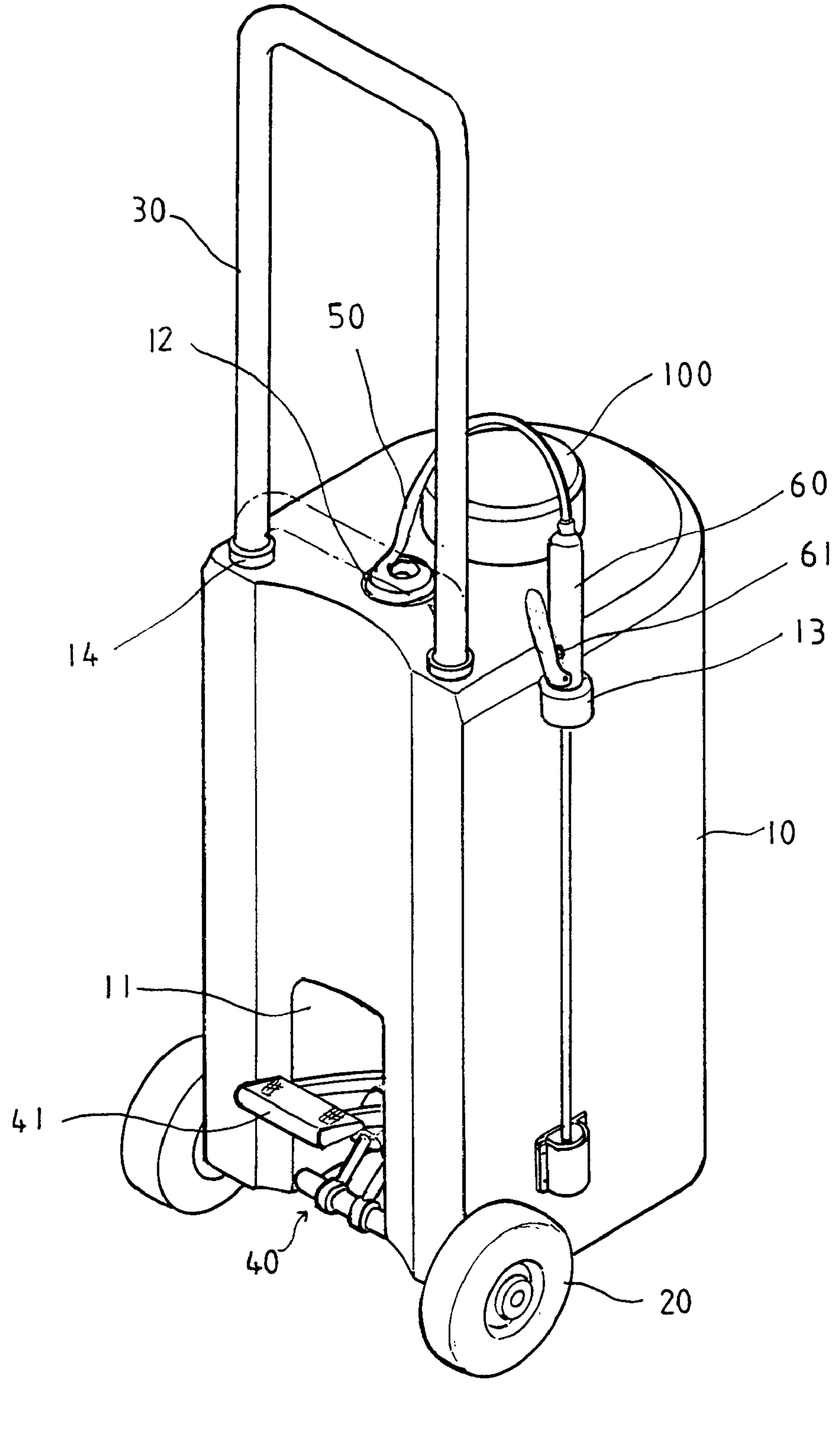
FIG. 1 is a perspective view of a first preferred embodiment of pesticide spraying cart according to the invention.
Figure 2:
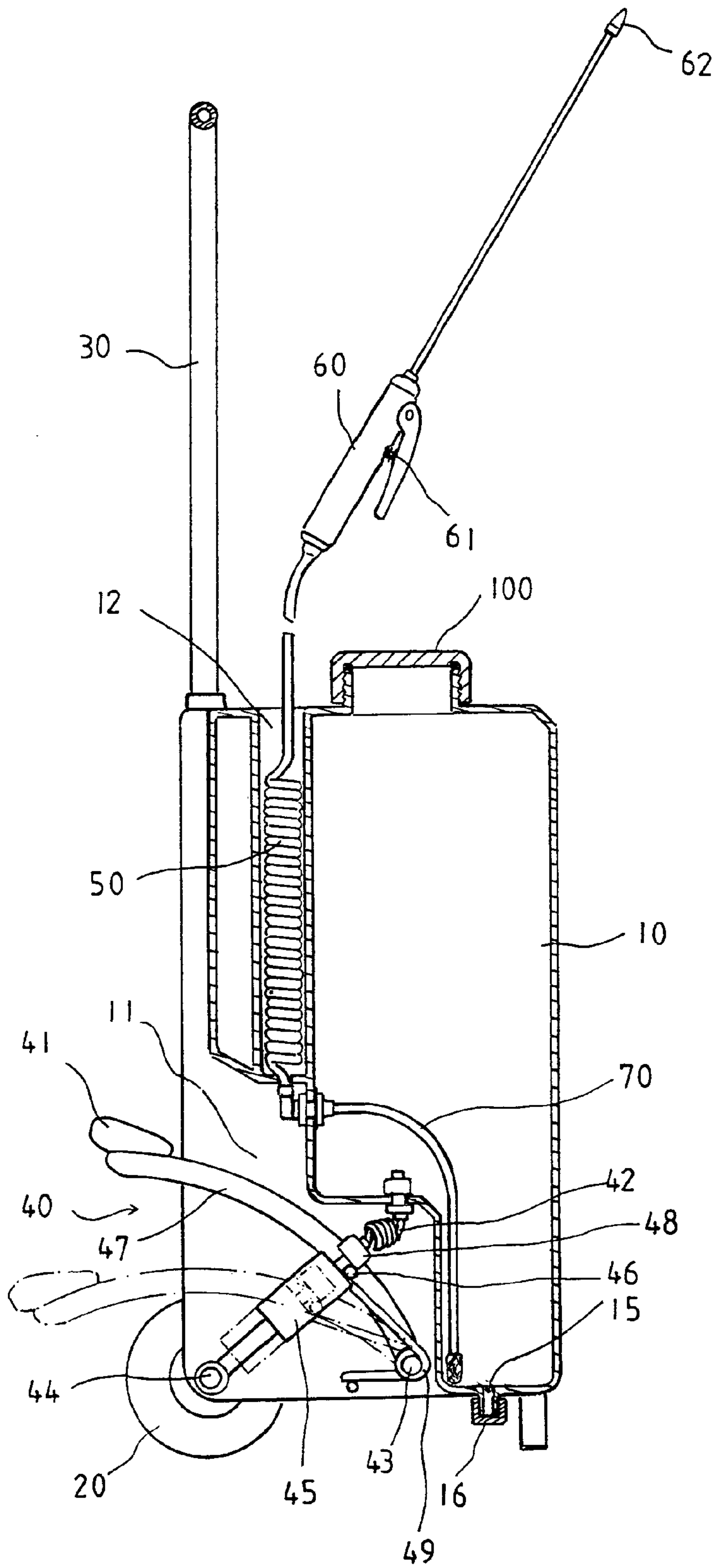
FIG. 2 schematically shows in section the cart of FIG. 1.
Figure 3:
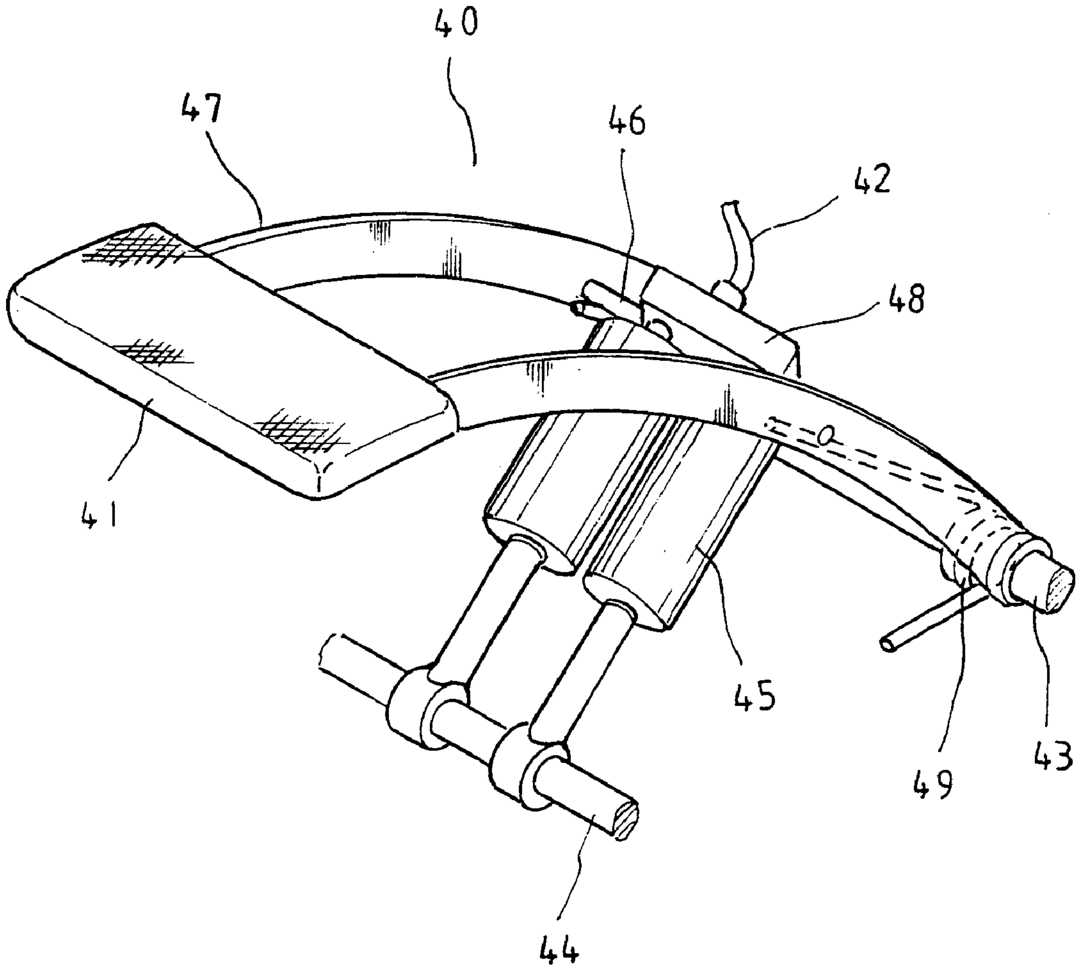
FIG. 3 is a perspective view of the pump assembly of FIG. 1.

Referring to FIGS. 1, 2, and 3, there is shown a pesticide spraying cart constructed in accordance with a first preferred embodiment of the invention. The cart comprises a pesticide tank 10, a retractable handle 30 vertically mounted in a rear of the tank 10, and two wheels 20 rotatably mounted at both rear bottom corners of the cart. A recess 11 is provided between the wheels 20 in a lower rear portion of the cart. A longitudinal hose compartment 12 is provided in the rear of the tank 10 and is open to a top of the cart and above the recess 11. The hose compartment 12 is in communication with the recess 11. A coil hose 50 is received in the hose compartment 12 in a storage position. A spray gun 60 is formed at an open end of the coil hose 50. The spray gun 60 comprises a trigger 61 and a nozzle 62. A bent pipe 70 is extended from the other end of the coil hose 50 into a position proximate a bottom of the tank 10. A pump assembly 40 is provided in the recess 11 and comprises a foot pedal 41 projected rearward beyond the recess 11, a coil pipe 42 being in fluid communication with the tank 10, a transverse, inner first bar 43 fixedly provided across the recess 11, a transverse, outer second bar 44 fixedly provided across the recess 11 and aligned with the wheels 20, two parallel air pumps 45 each including a piston rod at one end fixedly coupled to the second bar 44, two parallel arms 47 interconnected the foot pedal 41 and the first bar 43, a cross member 46 formed across the arms 47 and coupled to the other ends of the air pumps 45 between the arms 47, a reservoir 48 formed between outlets of the air pumps 45 and the coil pipe 42 and being in fluid communication therewith, and two torsion springs 49 mounted on both ends of the first bar 43, each spring 49 having one end urged against a bottom of the recess 11 and the other end urged against the cross member 46.

The cart further comprises a first cap 100 on top of the tank 10. In a case of the tank 10 being empty, a user may remove the cap 100 and pour pesticide into the tank 10 for filling. The tank 10 further comprises a hook 13 on one side of the tank 10, an outlet 15 in the bottom, and a second cap 16 threadedly secured to the outlet 15. For cleaning inside of the tank 10, a user may unfasten the second cap 16 to drain remaining pesticide contained in the tank 10 prior to cleaning with water.

In operation, a user may pull the handle 30 to its maximum. Next, the user may repeatedly press the foot pedal 41 to pressurize pesticide contained in the tank 10 to a maximum. Next, the user may pull or push the handle 30 to move the cart to a desired location and then pull the coil hose 50 out of the hose compartment 12. Next, the user may press the trigger 61 to shoot out a uniform spray of liquid pesticide from the nozzle 62 via the bent pipe 70 and the coil hose 50 onto, for example, flowers in a garden. Once the spraying is decreased due to insufficient pressure, the user may carry the spray gun 60 to the tank 10 and the coil hose 50 then retracts into the hose compartment 12 automatically. Thus, no tangling of the coil hose 50 is possible. Again, the user may repeatedly press the foot pedal 41 to pressurize pesticide contained in the tank 10 to a maximum prior to gardening. After use, the user may hang the trigger 61 on the hook 13 with the coil hose 50 received in the hose compartment 12. Also, the user may press down the handle 30 to retract almost all portions thereof inside the tank 10 with only its top handle bar exposed. This can reduce size of the cart in a storage position.

Figure 4:
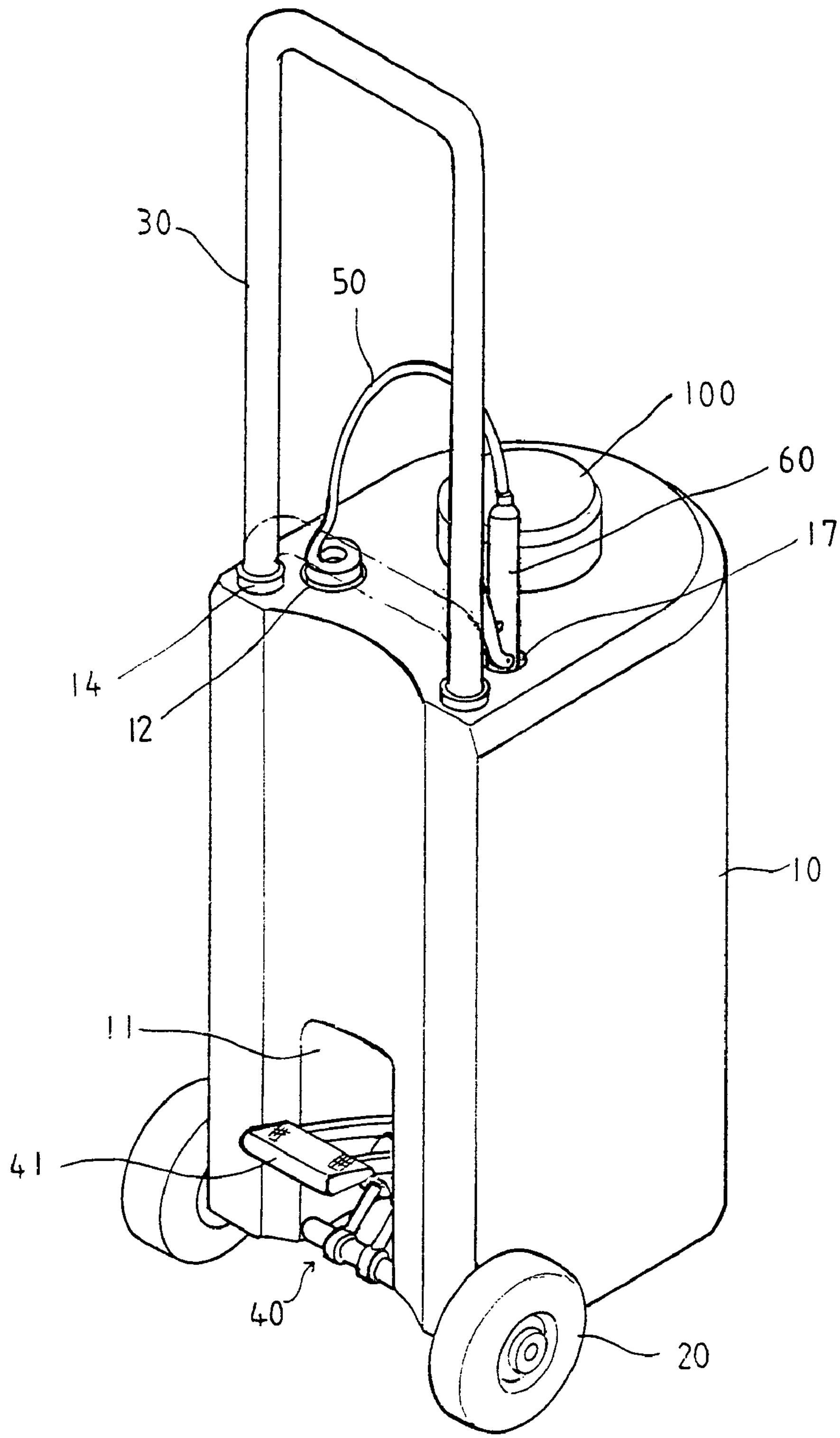
FIG. 4 is a perspective view of a second preferred embodiment of pesticide spraying cart according to the invention.

Referring to FIG. 4, a second preferred embodiment of pesticide spraying cart according to the invention is shown. The second preferred embodiment substantially has same structure as the first preferred embodiment. The difference between the first and the second preferred embodiments, i.e., the characteristic of the second preferred embodiment is detailed below. No hook is provided. Instead, a longitudinal spray gun chamber 17 is provided beside the hose compartment 12 for receiving the spray gun 60 in a storage position.

While the invention herein disclosed has been described by means of specific embodiments, numerous modifications and variations could be made thereto by those skilled in the art without departing from the scope and spirit of the invention set forth in the claims.

What is claimed is:

1. A pesticide spraying cart comprising:

a pesticide tank including a top filling opening and a bottom outlet;

a retractable handle longitudinally mounted in a rear of the tank;

two wheels rotatably mounted at both rear bottom corners of the cart;

a recess provided between the wheels in a lower rear portion of the cart;

a longitudinal hose compartment provided in the rear of the tank, the hose compartment being open to a top of the cart and disposed above the recess;

a coil hose adapted to either extend out of the hose compartment by pulling or retract thereinto automatically after the force exerted on the coil hose has been released;

a spray gun provided at an open end of the coil hose;

a hook provided on an outer surface of the tank for holding the spray gun in an unused position;

a pipe is extended from the other end of the coil hose into a position proximate a bottom of the tank; and a pump assembly provided in the recess and including a foot pedal projected rearward beyond the recess, a coil pipe being in fluid communication with the tank, a transverse, inner first bar fixedly provided across the recess, a transverse, outer second bar fixedly provided across the recess and aligned with the wheels, two parallel air pumps fixedly coupled to the second bar at its one ends, two parallel arms interconnected the foot pedal and the first bar, a cross member formed across the arms and coupled to the other ends of the air pumps, a reservoir formed between outlets of the air pumps and the coil pipe and being in fluid communication therewith, and two resilient members mounted on both ends of the first bar, each resilient member having one end urged against a bottom of the recess and the other end urged against the cross member;

whereby repeatedly pressing the foot pedal to pressurize pesticide contained in the tank, moving the cart to a predetermined location, pulling the coil hose out of the hose compartment, and activating the spray gun will shoot out a uniform spray of liquid pesticide.

2. The pesticide spraying cart of claim 1, wherein the resilient members are torsion springs.

3. A pesticide spraying cart comprising:

a pesticide tank including a top filling opening and a bottom outlet;

a retractable handle longitudinally mounted in a rear of the tank;

two wheels rotatably mounted at both rear bottom corners of the cart;

a recess provided between the wheels in a lower rear portion of the cart;

a longitudinal hose compartment provided in the rear of the tank, the hose compartment being open to a top of the cart and disposed above the recess;

a coil hose adapted to either extend out of the hose compartment by pulling or retract thereinto automatically after the force exerted on the coil hose has been released;

a spray gun provided at an open end of the coil hose;

a longitudinal spray gun chamber provided beside the hose compartment for receiving the spray gun in an unused position;

a pipe is extended from the other end of the coil hose into a position proximate a bottom of the tank; and a pump assembly provided in the recess and including a foot pedal projected rearward beyond the recess, a coil pipe being in fluid communication with the tank, a transverse, inner first bar fixedly provided across the recess, a transverse, outer second bar fixedly provided across the recess and aligned with the wheels, two parallel air pumps fixedly coupled to the second bar at its one ends, two parallel arms interconnected the foot pedal and the first bar, a cross member formed across the arms and coupled to the other ends of the air pumps, a reservoir formed between outlets of the air pumps and the coil pipe and being in fluid communication therewith, and two resilient members mounted on both ends of the first bar, each resilient member having one end urged against a bottom of the recess and the other end urged against the cross member;

whereby repeatedly pressing the foot pedal to pressurize pesticide contained in the tank, moving the cart to a predetermined location, pulling the coil hose out of the hose compartment, and activating the spray gun will shoot out a uniform spray of liquid pesticide.

4. The pesticide spraying cart of claim 3, wherein the resilient members are torsion springs.

* * * * *